United States Patent
Fox

(10) Patent No.: US 12,451,499 B2
(45) Date of Patent: Oct. 21, 2025

(54) AUXILIARY THERMAL REGULATION OF FUEL CELL STACK

(71) Applicant: Toyota Motor Engineering & Manufacturing North America, Inc., Plano, TX (US)

(72) Inventor: Dallas K. Fox, Yorba Lina, CA (US)

(73) Assignees: TOYOTA MOTOR ENGINEERING & MANUFACTURING NORTH AMERICA, INC, Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 714 days.

(21) Appl. No.: 17/732,752

(22) Filed: Apr. 29, 2022

(65) Prior Publication Data

US 2023/0352704 A1  Nov. 2, 2023

(51) Int. Cl.
*H01M 8/04007* (2016.01)
*B60H 1/00* (2006.01)
*B60L 50/72* (2019.01)
*B60L 58/33* (2019.01)
*B60L 58/34* (2019.01)
*H01M 8/04029* (2016.01)

(52) U.S. Cl.
CPC .... *H01M 8/04067* (2013.01); *B60H 1/00271* (2013.01); *B60H 1/00392* (2013.01); *B60H 1/00885* (2013.01); *B60H 1/00899* (2013.01); *B60L 50/72* (2019.02); *B60L 58/33* (2019.02); *B60L 58/34* (2019.02); *H01M 8/04029* (2013.01); *B60H 2001/00307* (2013.01); *H01M 2250/20* (2013.01)

(58) Field of Classification Search
CPC ......... H01M 8/04067; H01M 8/04029; H01M 2250/20; B60H 1/00271; B60H 1/00392; B60H 1/00885; B60H 1/00899; B60H 2001/00307; B60L 50/72; B60L 58/33; B60L 58/34
See application file for complete search history.

(56) References Cited

U.S. PATENT DOCUMENTS 6,383,672 B1 * 5/2002 Fujita ................ H01M 8/04029
                                                    429/442
10,170,778 B2    1/2019 Kim et al.
(Continued)

*Primary Examiner* — Milton I Cano
*Assistant Examiner* — Albert Michael Hilton
(74) *Attorney, Agent, or Firm* — Jordan IP Law, LLC

(57) ABSTRACT

One or more example electric vehicles (EV), auxiliary thermal regulation systems for an EV, a computer-implemented methods of operating an EV, and a computer program product for operating an EV. The EV includes an FC system and an HVAC system. The FC system includes an FC stack (FCS) operable to generate electric power, and an FC thermal management system including a first thermal regulation circuit for circulation of a radiant fluid operable to thermally regulate the FCS, and a heat exchange device operable to thermally regulate the radiant fluid. The HVAC system includes a second thermal regulation circuit for circulation of a refrigerant fluid operable to thermally regulate air in a passenger compartment of the vehicle, and a bi-directional heat pump operable to facilitate auxiliary/supplemental thermal regulation of the fuel cell stack by supplying selective auxiliary cooling and/or heating of the FCS.

7 Claims, 8 Drawing Sheets

(56) References Cited

U.S. PATENT DOCUMENTS

2021/0043951 A1    2/2021  Yano
2021/0391588 A1   12/2021  Won et al.
2022/0324288 A1* 10/2022  Cohan ..................... B60L 58/26

* cited by examiner

AUXILIARY THERMAL REGULATION OF FUEL CELL STACK

TECHNICAL FIELD

Embodiments relate to one or more one or more example electric vehicles (EV), auxiliary thermal regulation systems for an EV, a computer-implemented methods of operating a vehicle, and a computer program product for operating a vehicle. The vehicle includes an HVAC system having a bi-directional heat pump operable to facilitate auxiliary/supplemental thermal regulation of a fuel cell stack (FCS) by supplying selective auxiliary cooling and/or heating of the FCS.

BACKGROUND

Contemporary EVs generally include one or more fuel cell modules comprising one or more fuel cells (FC) arranged in a stack formation. Each FC in the stack may have a structure in the form of a membrane electrode assembly (MEA) that comprises an electrolyte membrane (e.g., a polymer electrolyte membrane) interposed between a first electrode (e.g., an anode) and a second electrode (e.g., a cathode). In operation, a first fuel reactant, for example, hydrogen ($H_2$), is supplied to the anode, while a second fuel reactant, for example, oxygen ($O_2$) is supplied via a stream of compressed air, is supplied to the cathode. The resultant exothermic reaction produces water and waste heat.

Because the FCS must operate at lower temperatures when compared to other EV power sources, it should be thermally managed or regulated during operation (e.g., during a driving sequence or during other power generation modes) in order to prevent overheating of the FCS. Contemporary thermal regulation of the FCS may incorporate a radiator to reject waste heat generated by the FCS.

The performance of the FCS is impacted by certain operating situations of the EV. For example, the EV will require greater power output by the FCS when driving up an inclined road surface. This will, in turn, increase the $T_{co}$ of the FCS, which may result in overheating of the FCS. Excessive heating of the FCS results in poor operating performance of the FCS.

The performance of the FCS is also impacted by the ambient environment. For example, in cold temperature environments in which the ambient temperature is near or below freezing, operating the EV from a cold start results in the FCS running rich. This results in the FCS receiving excess fuel (e.g., hydrogen) and insufficient ambient air. Moreover, water produced by the FCS may remain in the FCS and freeze at sub-freezing temperatures. This may prevent or delay the reactions within the FCS that are necessary to generate a power output by the FCS.

There are various preventative measures for cold-starts, one of which involves preheating the FCS via a heat source such as a positive temperature coefficient (PTC) heater. Use of an additional heat source, however, can result in additional manufacturing costs and may cause serious safety hazards.

BRIEF SUMMARY

In accordance with one or more embodiments, provided herein are one or more one or more example vehicles, auxiliary thermal regulation systems for a vehicle, and methods for operating a vehicle that enhance the overall operational performance of the vehicle. The one or more example vehicles, auxiliary thermal regulation systems for a vehicle, and methods for operating a vehicle are to: enhance the thermal regulation (e.g., cooling capability) and control of the FC thermal regulation system, enhance fuel efficiency upon warm up of the EV, enhance the overall efficiency of the FCS during normal operation (e.g., during a driving sequence or during other power generation modes), and enhance the resistance to overheating of the FCS during sustained high power output mode. For instance, the one or more embodiments may facilitate FC operation at greater power for an extended period of time via use of a bi-directional heat pump as an auxiliary thermal regulator of the FCS.

In accordance with one or more embodiments, an example EV may comprise one or more of the following: an FC system that includes an FCS operable to generate electric power, and an FC thermal management system including a first thermal regulation circuit for circulation of a radiant fluid operable to thermally regulate the FCS, and a heat exchange device operable to thermally regulate the radiant fluid; and a heating, ventilation, and air-conditioning (HVAC) system including a second thermal regulation circuit for circulation of a refrigerant fluid operable to thermally regulate air in an interior or passenger compartment of the vehicle, and a bi-directional heat pump operable to facilitate auxiliary/supplemental thermal regulation of the fuel cell stack. As used herein, "thermally regulate" encompasses the cooling (i.e., reducing the detected Too) of the FCS by a system, subsystem, or component of the EV. As used herein, "thermally regulate" also encompasses the heating (i.e., increasing the detected Too) of the FCS by a system, subsystem, or component of the EV. As used herein, "thermally regulate" further encompasses both the cooling and the heating of the FCS by a system, subsystem, or component of the EV.

In accordance with the example EV, the bi-directional heat pump facilitates thermal contact of the refrigerant fluid with the heat exchange device in a manner which facilitates selective auxiliary cooling and/or heating of the FCS.

In accordance with the example EV, a first bypass fluid conduit is provided operable to fluidically connect the bi-directional heat pump and the heat exchange device during a clockwise flow of the refrigerant fluid by the bi-directional heat pump, and one or more first control valves are arranged in the first bypass fluid conduit.

In accordance with the example EV, a second bypass fluid conduit arranged downstream of the evaporator/condenser and operable to fluidically connect the bi-directional heat pump and the heat exchange device during an anti-clockwise flow of the refrigerant fluid by the bi-directional heat pump, and one or more second control valves are arranged in the second bypass fluid conduit.

In accordance with the example EV, a control device is provided, and includes one or more processors and a non-transitory memory operatively coupled to the one or more processors comprising a set of instructions executable by the one or more processors to cause the control device to control, in response to a detection as sensor data of a current operating temperature (Too) of the FCS, the one or more first control valves and the one or more second control valves.

In accordance with the example EV, the set of instructions, when executed by the one or more processors, cause the control device to selectively open, in response to a detected $T_{co}$ being greater than a predetermined threshold operating temperature ($T_{pt}$), the one or more second control valves and thereby thermally regulate the FCS by causing a reduction of the $T_{co}$ of the FCS via the bi-directional heat pump to a value less than $T_{pt}$.

In accordance with the example EV, the set of instructions, when executed by the one or more processors, cause the control device to selectively open, in response to a detected $T_{co}$ being less than a $T_{pt}$, the one or more first control valves and thereby thermally regulate the FCS by causing an increase of the $T_{co}$ of the FCS via the bi-directional heat pump to a value greater than $T_{pt}$.

In accordance with one or more embodiments, an example EV may comprise one or more of the following: an FC system that includes an FCS operable to generate electric power; and an HVAC system having a thermal regulation circuit for circulation of a refrigerant fluid operable to thermally regulate air in a vehicle interior/passenger compartment, and a bi-directional heat pump operable to facilitate auxiliary thermal regulation of the fuel cell stack.

In accordance with the example EV, the fuel cell system further comprises an FC thermal management system having a second thermal regulation circuit for circulation of a radiant fluid operable to thermally regulate the FCS, and a heat exchange device operable to thermally regulate the radiant fluid.

In accordance with the example EV, the bi-directional heat pump facilitates thermal contact of the refrigerant fluid with the heat exchange device in a manner which facilitates selective auxiliary cooling and/or heating of the FCS.

In accordance with the example EV, a first bypass fluid conduit is provided operable to fluidically connect the bi-directional heat pump and the heat exchange device during a clockwise flow of the refrigerant fluid by the bi-directional heat pump, and one or more first control valves are arranged in the first bypass fluid conduit.

In accordance with the example EV, a second bypass fluid conduit arranged downstream of the evaporator/condenser and operable to fluidically connect the bi-directional heat pump and the heat exchange device during an anti-clockwise flow of the refrigerant fluid by the bi-directional heat pump, and one or more second control valves are arranged in the second bypass fluid conduit.

In accordance with the example EV, a control device is provided, and includes one or more processors and a non-transitory memory operatively coupled to the one or more processors comprising a set of instructions executable by the one or more processors to cause the control device to control, in response to a detection as sensor data of a $T_{co}$ of the fuel stack, the one or more first control valves and the one or more second control valves.

In accordance with the example EV, the set of instructions, when executed by the one or more processors, cause the control device to selectively open, in response to a detected $T_{co}$ being greater than a $T_{pt}$, the one or more second control valves and thereby thermally regulate the FCS by causing a reduction of the $T_{co}$ of the FCS via the bi-directional heat pump to a value less than $T_{pt}$.

In accordance with the example EV, the set of instructions, when executed by the one or more processors, cause the control device to selectively open, in response to a detected $T_{co}$ being less than a $T_{pt}$, the one or more first control valves and thereby thermally regulate the FCS by causing an increase of the $T_{co}$ of the FCS via the bi-directional heat pump to a value greater than $T_{pt}$.

In accordance with one or more embodiments, an example auxiliary thermal regulation system for a vehicle that includes an FC system that includes an FC stack (FCS) operable to generate electric power, the auxiliary thermal regulation system comprising one or more of the following: a heating, ventilation, and air-conditioning (HVAC) system having a thermal regulation circuit for circulation of a refrigerant fluid operable to thermally regulate air in a vehicle interior/passenger compartment, and a bi-directional heat pump operable to facilitate auxiliary thermal regulation of the fuel cell stack.

In accordance with the example auxiliary thermal regulation system, the fuel cell system further comprises an FC thermal management system having a second thermal regulation circuit for circulation of a radiant fluid operable to thermally regulate the FCS, and a heat exchange device operable to thermally regulate the radiant fluid.

In accordance with the example auxiliary thermal regulation system, the bi-directional heat pump facilitates thermal contact of the refrigerant fluid with the heat exchange device in a manner which facilitates selective auxiliary cooling and/or heating of the FCS.

In accordance with the example auxiliary thermal regulation system, a first bypass fluid conduit is provided operable to fluidically connect the bi-directional heat pump and the heat exchange device during a clockwise flow of the refrigerant fluid by the bi-directional heat pump, and one or more first control valves are arranged in the first bypass fluid conduit.

In accordance with the example auxiliary thermal regulation system, a second bypass fluid conduit arranged downstream of the evaporator/condenser and operable to fluidically connect the bi-directional heat pump and the heat exchange device during an anti-clockwise flow of the refrigerant fluid by the bi-directional heat pump, and one or more second control valves are arranged in the second bypass fluid conduit.

In accordance with the example auxiliary thermal regulation system, a control device is provided, and includes one or more processors and a non-transitory memory operatively coupled to the one or more processors comprising a set of instructions executable by the one or more processors to cause the control device to control, in response to a detection as sensor data of an $T_{co}$ of the fuel stack, the one or more first control valves and the one or more second control valves.

In accordance with the example EV, the set of instructions, when executed by the one or more processors, cause the control device to selectively open, in response to a detected $T_{co}$ being greater than a $T_{pt}$, the one or more second control valves and thereby thermally regulate the FCS by causing a reduction of the $T_{co}$ of the FCS via the bi-directional heat pump to a value less than $T_{pt}$.

In accordance with the example auxiliary thermal regulation system, the set of instructions, when executed by the one or more processors, cause the control device to selectively open, in response to a detected $T_{co}$ being less than $T_{pt}$, the one or more first control valves and thereby thermally regulate the FCS by causing an increase of the Too of the FCS via the bi-directional heat pump to a value greater than $T_{pt}$.

In accordance with one or more embodiments, an example computer program product is provided for operating an EV that includes a FC system that having an FCS operable to generate electric power, and an HVAC system operable to provide air in a vehicle interior/passenger compartment. The example computer program product includes at least one computer readable medium comprising a set of instructions, which when executed by one or more processors, cause the one or more processors to thermally regulate the FCS by fluidically connecting a $1^{st}$ thermal regulation circuit for the FC system and a $2^{nd}$ thermal regulation circuit for the HVAC system in a manner which auxiliary heats the FCS via a bi-directional heat pump of the HVAC system.

In accordance with one or more embodiments, an example computer-implemented method of operating an EV that includes a FC system that having an FCS operable to generate electric power, and an HVAC system operable to provide air in a vehicle interior/passenger compartment. The example computer-implemented method may comprise one or more of the following: thermally regulating the FCS by fluidically connecting a $1^{st}$ thermal regulation circuit for the FC system and a $2^{nd}$ thermal regulation circuit for the HVAC system in a manner which auxiliary heats the FCS via a bi-directional heat pump of the HVAC system.

BRIEF DESCRIPTION OF THE SEVERAL VIEWS OF THE DRAWINGS

The various advantages of the one or more embodiments will become apparent to one skilled in the art by reading the following specification and appended claims, and by referencing the following drawings, in which:

DETAILED DESCRIPTION

Figure 1:
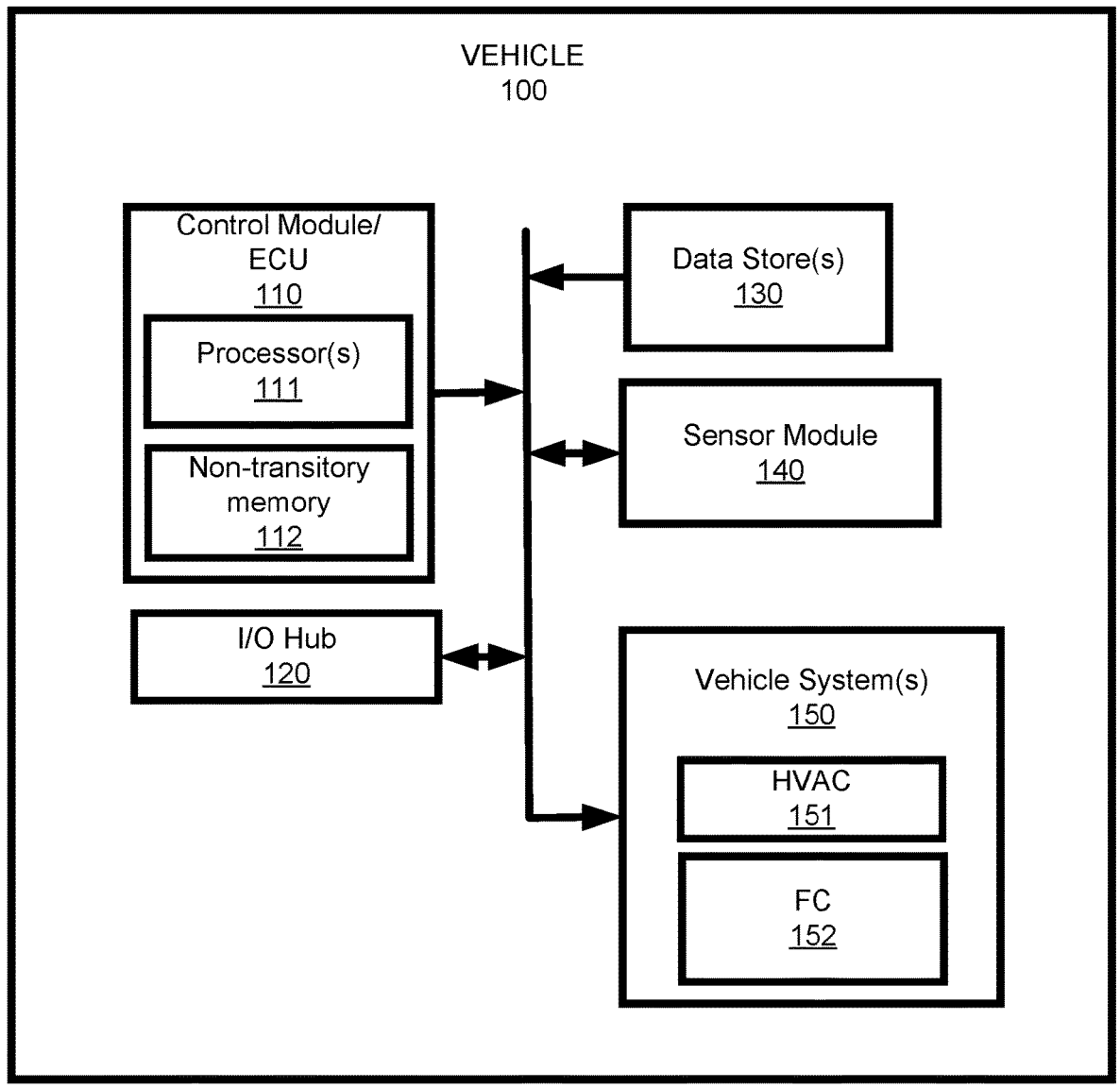
FIG. 1 illustrates a vehicle, in accordance with one or more embodiments set forth, described, and/or illustrated herein.

FIG. 1 illustrates an example vehicle 100 in accordance with one or more embodiments set forth, described, and/or illustrated herein. The illustrated example vehicle 100 may have mobility applications such as, for example, as an electric vehicle (EV), to include airborne electric vehicles, seaborne electric vehicles, electrically-powered spacecraft, and ground vehicles (e.g., hybrid electric vehicles (HEV), plug-in hybrid electric vehicles (PHEV), battery electric vehicles (BEV), fuel cell electric vehicles (FCEV), and railborne electric vehicles (REV)).

In one or more embodiments, the vehicle 100 may comprise one or more operational elements, some of which may be a part of an autonomous driving system. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

In one or more embodiments, the example vehicle 100 may not include one or more of the elements illustrated in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

The example vehicle 100 comprises a control module/electronic control unit (ECU) 110, an I/O hub 120, one or more data stores 130, a sensor system 140, and one or more vehicle systems 150 including, but not limited to, an HVAC system 151 and a power generation or FC system 152. Although the example FC system 152 may be implemented for mobility applications, embodiments are not limited thereto, and thus, this disclosure contemplates that the FC system 152 may be implemented in non-mobility or stationary applications such as, for example, industrial power generation systems or residential power generation systems.

The control/module/ECU 110 comprises one or more processors 111 and a non-transitory memory 112 operatively coupled to the one or more processors 111 comprising a set of instructions executable by the one or more processors 111 to cause the one or more processors 111 to execute one or more one or more instructions to control various operational systems, subsystems, and components of the vehicle 100. In accordance with one or more embodiments set forth, described, and/or illustrated herein, "processor" means any component or group of components that are configured to execute any of the processes described herein or any form of instructions to carry out such processes or cause such processes to be performed. The one or more processors 111 may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 111 may comprise at least one hardware circuit (e.g., an integrated circuit) configured to carry out one or more instructions contained in program code. In embodiments in which there is a plurality of processors 111, such processors 111 may work independently from each other, or one or more processors 111 in the plurality may work in combination with each other. In one or more embodiments, the one or more processors 111 may be a host, main, or primary processor of the vehicle 100.

The I/O hub 120 may be operatively connected to other systems and subsystems of the vehicle 100. The I/O hub 120 may comprise an input interface and an output interface. The input interface and the output interface may be integrated as a single, unitary interface, or alternatively, be separate as independent interfaces that are operatively connected.

In accordance with one or more embodiments, the input interface may be used by a user, such as, for example, a user, operator (including remote operator), or driver of the vehicle 100, to input as a data input signal 301 (See FIG. 4), a selected predetermined vehicle driving mode among a plurality of predetermined vehicle driving modes to accommodate a driving style of the user, operator, or driver in a manner that achieves thermal management or regulation of the HVAC system 151 and the power generation system 152. Each predetermined vehicle driving mode may have a corresponding thermal management profile during operation of the vehicle 100.

The input interface is defined herein as any device, component, system, subsystem, element, or arrangement or groups thereof that enable information/data to be entered in a machine. The input interface may receive an input from the user, operator, or driver of the vehicle 100. In accordance with one or more example embodiments, the input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure. For example, the input interface may comprise a keypad, toggle switch, touch screen, multi-touch screen, button, joystick, mouse, trackball, microphone and/or combinations thereof.

The output interface is defined herein as any device, component, system, subsystem, element, or arrangement or groups thereof that enable information/data to be presented to the vehicle operator and/or a remote operator of the vehicle 100. The output interface may be operable to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

The one or more data stores 130 are configured to store one or more types of data. The vehicle 100 may include interfaces that enable one or more systems thereof to manage, retrieve, modify, add, or delete, the data stored in the data stores 130. The one or more data stores 130 may comprise volatile and/or non-volatile memory. Examples of suitable data stores 130 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 130 may be a component of the one or more processors 111, or alternatively, may be operatively connected to the one or more processors 111 for use thereby. As set forth, described, and/or illustrated herein, "operatively connected" may include direct or indirect connections, including connections without direct physical contact.

The sensor module 140 is operable to, at least during operation of the vehicle 100, dynamically detect, capture, determine, assess, monitor, measure, quantify, and/or sense one or more operational parameters, elements, or features of the vehicle 100, such as, the $T_{co}$ of the FCS 152b. As set forth, described, and/or illustrated herein, "sensor" means any device, component, system, and/or subsystem that can perform one or more of detecting, determining, assessing, monitoring, measuring, quantifying, and sensing something. The one or more sensors may be operable to detect, determine, assess, monitor, measure, quantify and/or sense in real-time. As set forth, described, and/or illustrated herein, "real-time" means a level of processing responsiveness that a user, system, or subsystem senses as sufficiently immediate for a particular process or determination to be made, or that enables the processor to keep up with some external process.

In accordance with one or more embodiments, the sensor module 140 comprises one or more temperature sensors operatively connected to the control module ECU and/or the FC control module 151i, the data stores 130, and/or other elements, components, modules, systems, and subsystems of the vehicle 100. Embodiments, however, are not limited thereto. This disclosure contemplates the sensor module 140 comprising any suitable sensor architecture that permits practice of the one or more embodiments. The one or more temperature sensors may work independently from each other, or alternatively, may work in combination with each other. The one or more temperature sensors may be used in any combination, and may be used redundantly to validate and enhance the accuracy of the detection.

Figure 2A:
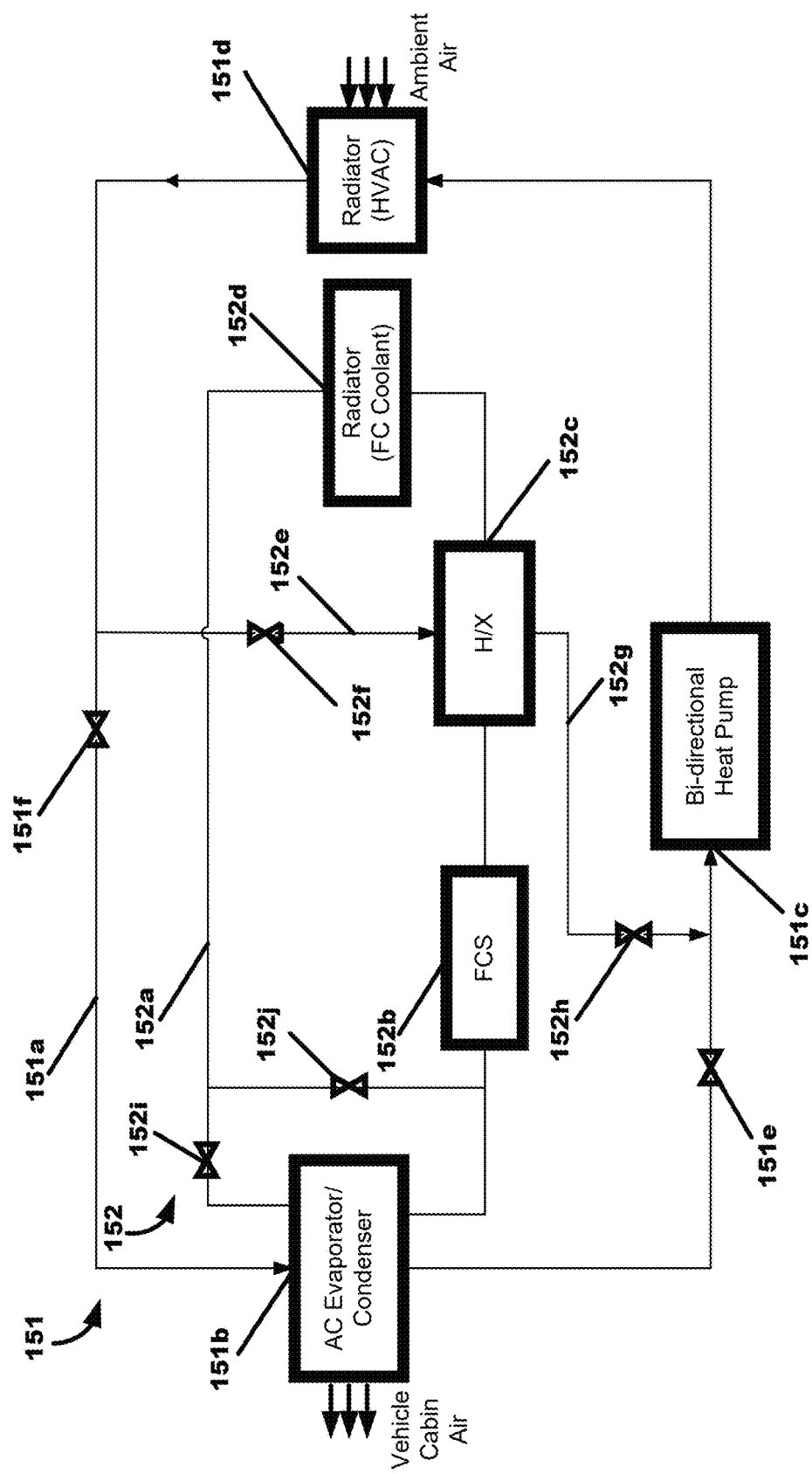
FIGS. 2A and 2B illustrates a circuit diagram of a cooling cycle and a heating cycle for an auxiliary thermal regulation system for an FCS of the vehicle of FIG. 1.
Figure 2B:
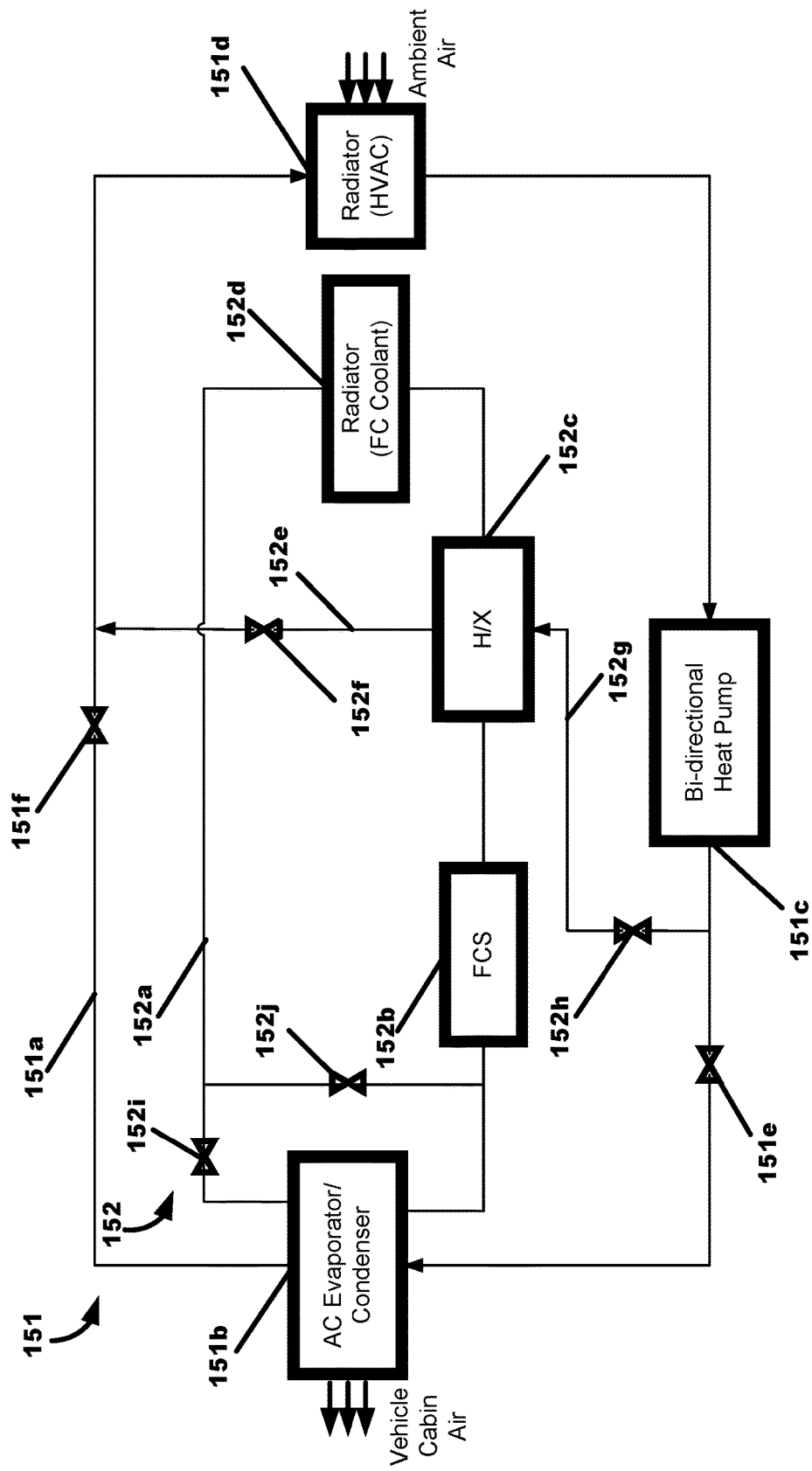

As illustrated in FIGS. 2A and 2B, an auxiliary thermal regulation system includes the components of the HVAC system 151 and the FC control module 151.

The HVAC system 151 includes, but is not limited to, a thermal regulation circuit 151a for circulation of a refrigerant fluid operable to thermally regulate air in an interior/passenger compartment of the vehicle 100. The thermal regulation circuit 151a is fluidically connected to an AC evaporator/condenser 151b that supplies air (depending upon a user-selected mode, cool air or heated air) to the interior/passenger compartment, a bi-directional heat pump 151c operable to drive a cooled refrigerant fluid through the thermal regulation circuit 151a and also facilitate auxiliary thermal regulation of the FCS 152b. The thermal regulation circuit 151a is also fluidically connected to a radiator 151d that transmits heated absorbed from the refrigerant fluid to the ambient environment outside of the vehicle 100. One or more valves may also be provided in the thermal regulation circuit 151a to control the flow of the refrigerant fluid, including but not limited to a first valve 151e arranged between the AC evaporator/condenser 151b and the bi-directional heat pump 151c, and a second valve 151f arranged between the AC evaporator/condenser 151b and the radiator 151d.

The FC system 152 includes an FC thermal management system to thermally regulate the FCS 152b. The FC thermal management system includes, but is not limited to, a second thermal regulation circuit 152a for circulation of a radiant fluid that thermally regulates the FCS 152b, a heat exchange device 152c that thermally regulates the radiant fluid, and a radiator 152d to transmit heat absorbed from the radiant fluid to an area outside of the FCS 152b.

The first thermal regulation circuit 151a and the second thermal regulation circuit 152a are fluidically connected at two regions by a first bypass fluid conduit 152g having one or more first control valves 152h arranged therein and a second bypass fluid conduit 152f having one or more second control valves 152f arranged therein.

During operation of vehicle 100 in a general cooling cycle of the FCS 152, the control valves 152f, 152h in fluidic communication with the heat exchange device 152c are closed to facilitate independent cooling (i.e., without activation of auxiliary cooling via the bi-directional heat pump 151c) the FCS 152 by the heat exchange device 152c.

In the illustrated example of FIG. 2A, during operational conditions in which auxiliary cooling of the FCS 152 is necessary, the one or more second control valves 152f are selectively opened to fluidically connect the thermal regulation circuit 151a and the second bypass fluid conduit 152e, which in turn, thermally connects the bi-directional heat pump 151c and the heat exchange device 152c. The bi-directional heat pump 151c drives cooled refrigerant fluid in an anti-clockwise flow path through the second bypass fluid conduit 152e to facilitate thermal contact of the cooled refrigerant fluid with the heat exchange device 152c. Such thermal contact, in turn, cools the radiant fluid that flows through the second thermal regulation circuit 152a to cause auxiliary cooling of the FCS 152b via the bi-directional heat pump 151c. Meaning, in situations where it is necessary to reduce the $T_{co}$ of the FCS 152b to a value less than the $T_{pt}$ value, the bi-directional heat pump 151c may be caused (e.g., via the control module/ECU 110 and/or the FC control module 152i) to drive the cooled refrigerant fluid along an anti-clockwise flow path. The cooled refrigerant fluid is to then contact the heat exchange device 152c to provide auxiliary cooling of the radiant fluid that flows through the heat exchange device 152c, which in turn, causes a reduction in the detected $T_{co}$ of the FCS 152b. The bi-directional heat pump 151c may be caused to drive the drive the cooled refrigerant at least until the detected $T_{co}$ of the FCS 152b is less than the $T_{pt}$ value.

During operation of vehicle 100 in a general heating cycle of the FCS 152, the control valves 152f, 152h in fluidic communication with the heat exchange device 152c are closed to facilitate independent heating (i.e., without activation of auxiliary heating via the bi-directional heat pump 151c) the FCS 152 by the heat exchange device 152c.

In the illustrated example of FIG. 2B, during operational conditions in which auxiliary heating of the FCS 152 is necessary, the one or more first control valves 152h are selectively opened to fluidically connect the thermal regulation circuit 151a and the first bypass fluid conduit 152g, which in turn, thermally connects the bi-directional heat pump 151c and the heat exchange device 152c. Such auxiliary heating may occur, for example, during freezing or sub-freezing temperatures during warm up of the vehicle 100. The bi-directional heat pump 151c drives heated refrigerant fluid in a clockwise flow direction through the first bypass fluid conduit 152g to facilitate thermal contact of the heated refrigerant fluid with the heat exchange device 152c. Such thermal contact, in turn, heats the radiant fluid that flows through the second thermal regulation circuit 152a to cause auxiliary heating of the FCS 152b via the bi-directional heat pump 151c. Meaning, in situations where it is necessary to increase the detected $T_{co}$ of the FCS 152b above the $T_{pt}$ value, the bi-directional heat pump 151c may be caused (e.g., via the control module/ECU 110 and/or the FC control module 152i) to drive the heated refrigerant fluid along a clockwise flow path. The heated refrigerant fluid is to then contact the heat exchange device 152c to provide auxiliary heating of the radiant fluid that flows through the heat exchange device 152c, which in turn, causes an increase in the detected $T_{co}$ of the FCS 152b. The bi-directional heat pump 151c may be caused to drive the drive the heated refrigerant at least until the detected $T_{co}$ of the FCS 152b is greater the temperature $T_{pt}$ value.

Figure 3:
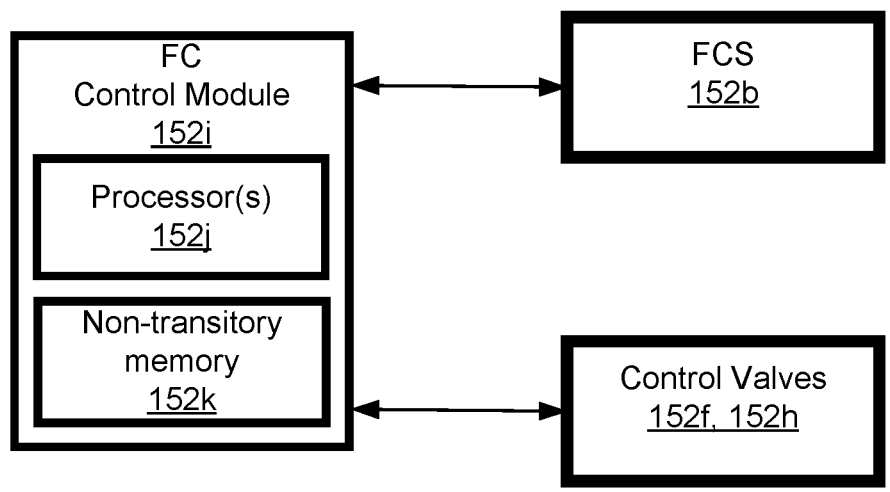
FIG. 3 illustrates a block diagram of an FC control module for the vehicle of FIG. 1.

In the illustrated example of FIG. 3, in one or more embodiments, the FC system 152 is controlled by the FC control module 152i. The FC control module 152i is operatively connected to one or more of the control/module/ECU 110, the I/O hub 120, the sensor module 140, and other systems, subsystems, and components of the vehicle 100. The FC control module 152i comprises one or more processors 151j and a non-transitory memory 151k operatively coupled to the one or more processors 151j comprising a set of instructions executable by the one or more processors 151j to cause the one or more processors 151j to execute one or more one or more instructions to control the FC system 152. In accordance with one or more embodiments set forth, described, and/or illustrated herein, "processor" means any component or group of components that are configured to execute any of the processes described herein or any form of instructions to carry out such processes or cause such processes to be performed. The one or more processors 151j may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 151j may comprise at least one hardware circuit (e.g., an integrated circuit) configured to carry out one or more instructions contained in program code. In embodiments in which there is a plurality of processors 151j, such processors 151j may work independently from each other, or one or more processors 151j in the plurality may work in combination with each other.

Figure 4:
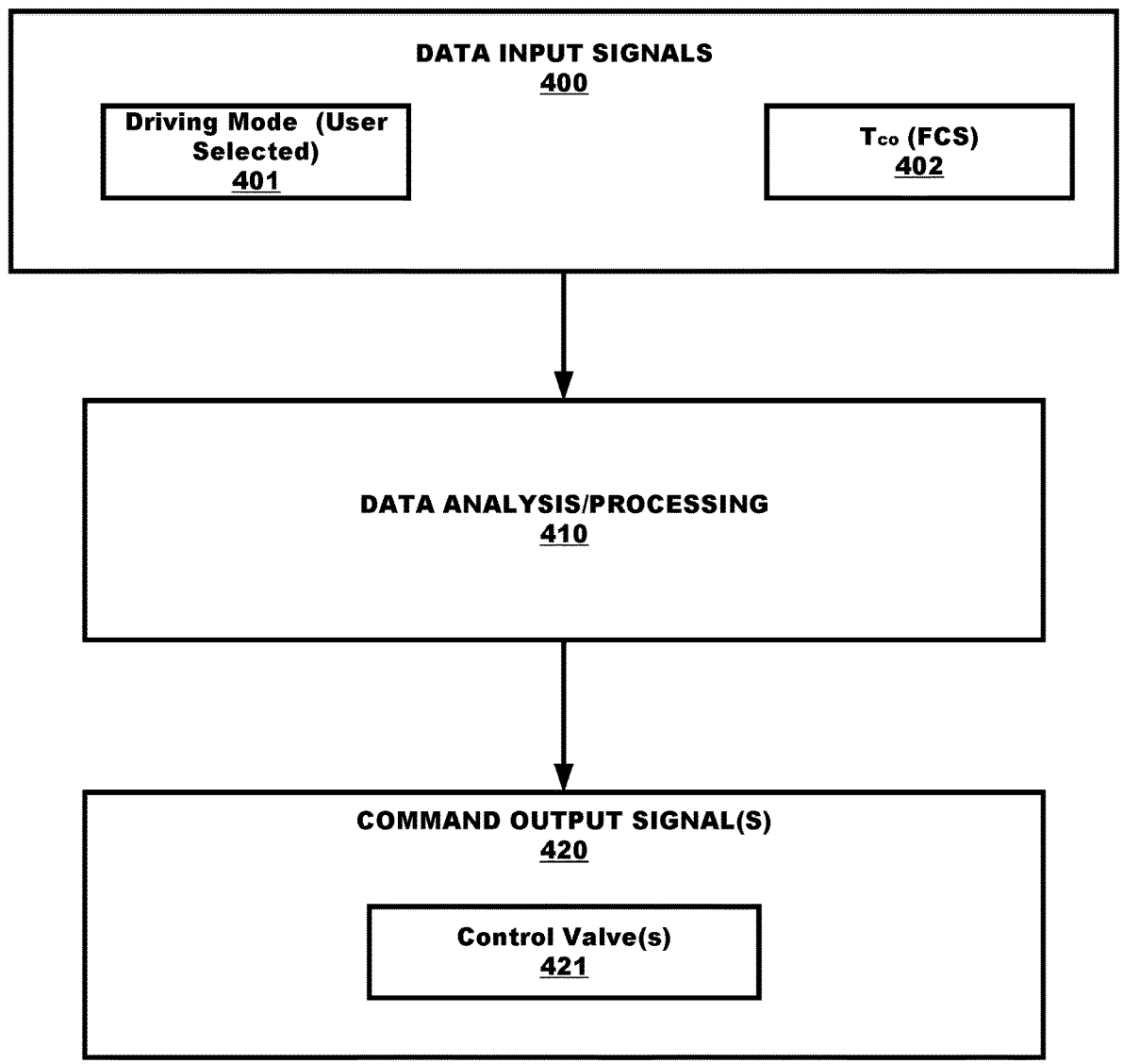
FIG. 4 illustrates a diagram of one or more control blocks for operating the vehicle of FIG. 1.

As illustrated in FIG. 4, during operation of the vehicle 100, the FC control module 152i is operable to dynamically receive one or more data input signals 401 related to a user-selected driver mode 401 and one or more data input signals related to the detected $T_{co}$ 402 of the FCS 152b. In response thereto, the FC control module 152i is operable to dynamically execute a temperature analysis 410 of the user-selected driver mode 401 and the detected $T_{co}$ 402 input signals. The analysis comprises executing a comparison of the detected $T_{co}$ to $T_{pt}$.

In response to the temperature analysis 410, the FC control module 152i may then transmit one or more control signals 420 to control the one or more first control valves 152h and the one or second first control valves 152f. In accordance with one or more example embodiments, in cold weather ambient conditions when the vehicle 100 is placed in a non-operating state (e.g., ignition is in an off state), the FC control module 152i is operable to receive the one or more data input signals 300 via a wired or a wireless network interface to control the FC system 152. In one or more example embodiments, the FC control module 152i may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or a combination thereof. Embodiments, however, are not limited thereto, and thus, this disclosure contemplates any suitable other suitable wireless network architecture that permits practice of the one or more embodiments.

Alternatively, or additionally, in an instance where the user, operator, or rider selects a specific or predetermined vehicle driving mode, the FC control module 152i may then transmit one or more control signals 420 in response to the selected predetermined vehicle driving mode and the temperature analysis.

In the illustrated examples of FIGS. 5 to 10, a flowchart of computer-implemented methods 500, 600, 700, 800, 900, and 1000 of operating a vehicle. In one or more examples, the respective flowcharts of the methods 500, 600, 700, 800, 900, and 1000 may be implemented by the one or more processors 111 of the ECU/Control module 111 and/or the one or more processors 152j of the FC control module 152j. In particular, the computer-implemented methods 500, 600, 700, 800, 900, and 1000 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In one or more examples, software executed by the ECU/Control module 111 and/or the FC control module 152*j* provides functionality described or illustrated herein. In particular, software executed by the one or more processors 111 of the ECU/Control module 111 and/or the one or more processors 152*j* of the FC control module 152*j* is configured to perform one or more processing blocks of the computer-implemented methods 500, 600, 700, 800, 900, and 1000 set forth, described, and/or illustrated herein, or provides functionality set forth, described, and/or illustrated.

Figure 5:
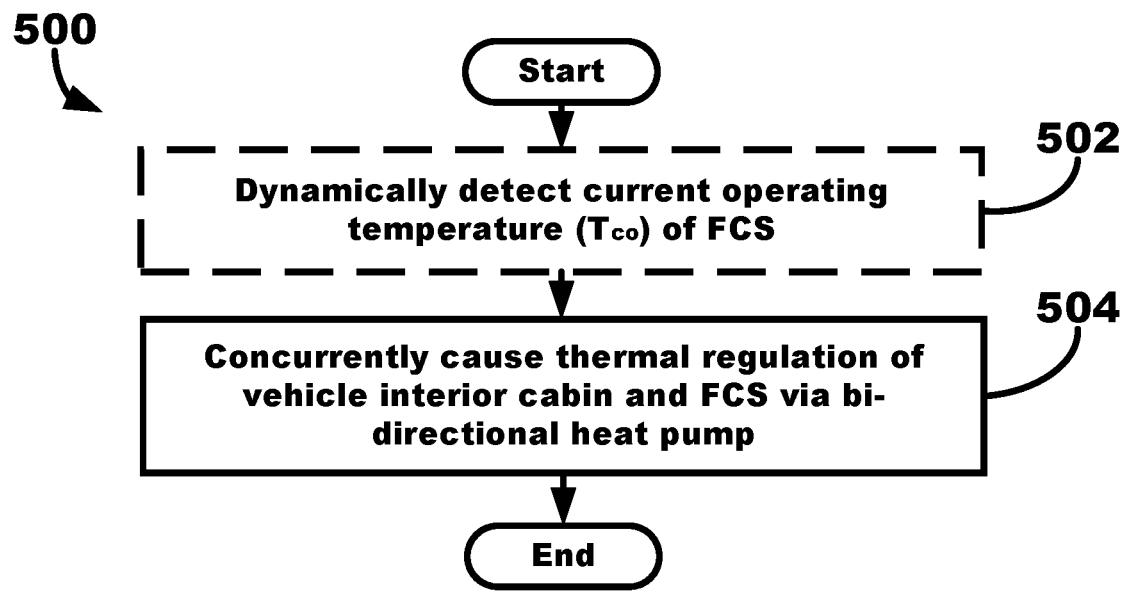
FIGS. 5 through 10 respectively illustrate a flowchart of a computer-implemented method of operating a vehicle, in accordance with one or more embodiments set forth, described, and/or illustrated herein.

In the illustrated example embodiment of FIG. 5, illustrated process block 502 includes dynamically detecting $T_{co}$ of the FCS 152*b*.

The computer-implemented method 500 may then proceed to illustrated process block 504, which includes concurrently causing, in response to the detection of the $T_{co}$, thermal regulation of the vehicle interior cabin of the vehicle and thermal regulation of the FCS 152*b* via a bi-directional heat pump of the vehicle HVAC system.

In accordance with the computer-implemented method 500, thermal regulation of the FCS 152*b* via a bi-directional heat pump comprises opening one or more control valves arranged in a bypass line to fluidically connect a $1^{st}$ thermal regulation circuit for the FCS 152*b* and a $2^{nd}$ thermal regulation circuit for the vehicle HVAC system.

In accordance with the computer-implemented method 500, thermal regulation of the FCS 152*b* via a bi-directional heat pump comprises entering the FCS 152*b* into an auxiliary cooling cycle by causing an auxiliary reduction of the detected Too via the bi-directional heat pump to a value less than $T_{pt}$.

In accordance with the computer-implemented method 500, thermal regulation of the FCS 152*b* via a bi-directional heat pump comprises entering the FCS 152*b* into an auxiliary heating cycle by causing an auxiliary increase of the detected Too via the bi-directional heat pump to a value greater than $T_{pt}$.

The computer-implemented method 500 can terminate or end after completion of illustrated process block 504.

Figure 6:
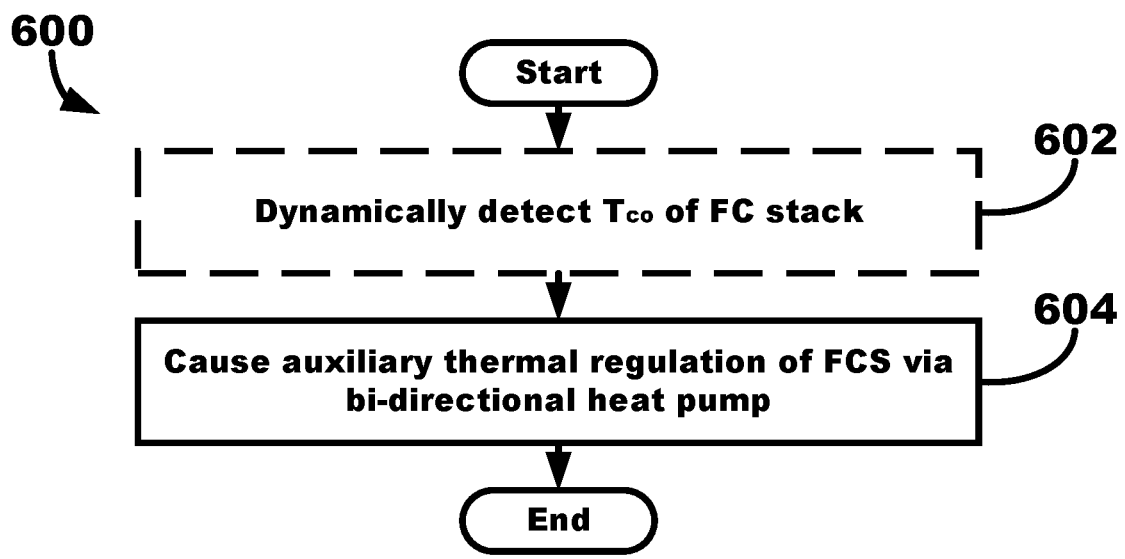

In the illustrated example embodiment of FIG. 6, illustrated process block 602 includes dynamically detecting $T_{co}$ of the FCS 152*b*.

The computer-implemented method 600 may then proceed to illustrated process block 604, which includes causing, in response to the detection of the Too, thermal regulation of the FCS 152*b* via a bi-directional heat pump of the vehicle HVAC system.

In accordance with the computer-implemented method 500, thermal regulation of the FCS 152*b* via a bi-directional heat pump comprises opening one or more control valves arranged in a bypass line to fluidically connect a $1^{st}$ thermal regulation circuit for the FCS 152*b* and a $2^{nd}$ thermal regulation circuit for the vehicle HVAC system.

In accordance with the computer-implemented method 600, thermal regulation of the FCS 152*b* via a bi-directional heat pump comprises entering the FCS 152*b* into an auxiliary cooling cycle by causing an auxiliary reduction of the detected Too via the bi-directional heat pump to a value less than $T_{pt}$.

In accordance with the computer-implemented method 600, thermal regulation of the FCS 152*b* via a bi-directional heat pump comprises entering the FCS 152*b* into an auxiliary heating cycle by causing an auxiliary increase of the detected Too via the bi-directional heat pump to a value greater than $T_{pt}$.

The computer-implemented method 600 can terminate or end after completion of illustrated process block 604.

Figure 7:
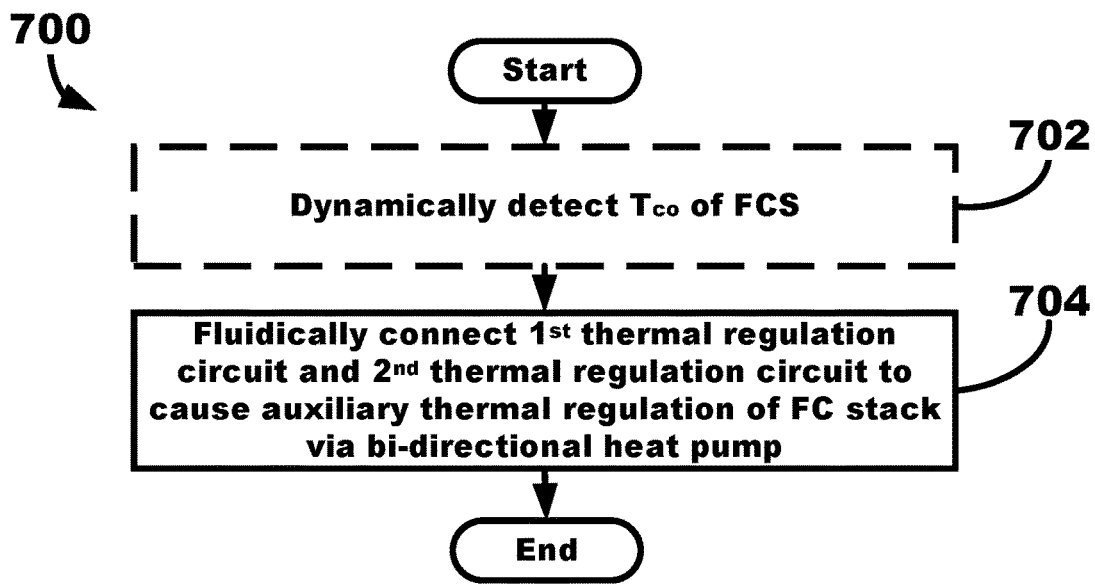

In the illustrated example embodiment of FIG. 7, illustrated process block 702 includes dynamically detecting $T_{co}$ of the FCS 152*b*.

The computer-implemented method 700 may then proceed to illustrated process block 704, which includes fluidically connecting, in response to the detection of the Too, a $1^{st}$ thermal regulation circuit for the FCS 152*b* and a $2^{nd}$ thermal regulation circuit for the vehicle HVAC system to cause thermal regulation of the FCS 152*b* via a bi-directional heat pump of the vehicle HVAC system.

In accordance with the computer-implemented method 700, thermal regulation of the FCS 152*b* via a bi-directional heat pump comprises opening one or more control valves to fluidically connect the $1^{st}$ thermal regulation circuit and a $2^{nd}$ thermal regulation circuit.

In accordance with the computer-implemented method 700, thermal regulation of the FCS 152*b* via a bi-directional heat pump comprises entering the FCS 152*b* into an auxiliary cooling cycle by causing an auxiliary reduction of the detected Too via the bi-directional heat pump to a value less than $T_{pt}$.

In accordance with the computer-implemented method 700, thermal regulation of the FCS 152*b* via a bi-directional heat pump comprises entering the FCS 152*b* into an auxiliary heating cycle by causing an auxiliary increase of the detected Too via the bi-directional heat pump to a value greater than $T_{pt}$.

The computer-implemented method 700 can terminate or end after completion of illustrated process block 704.

Figure 8:
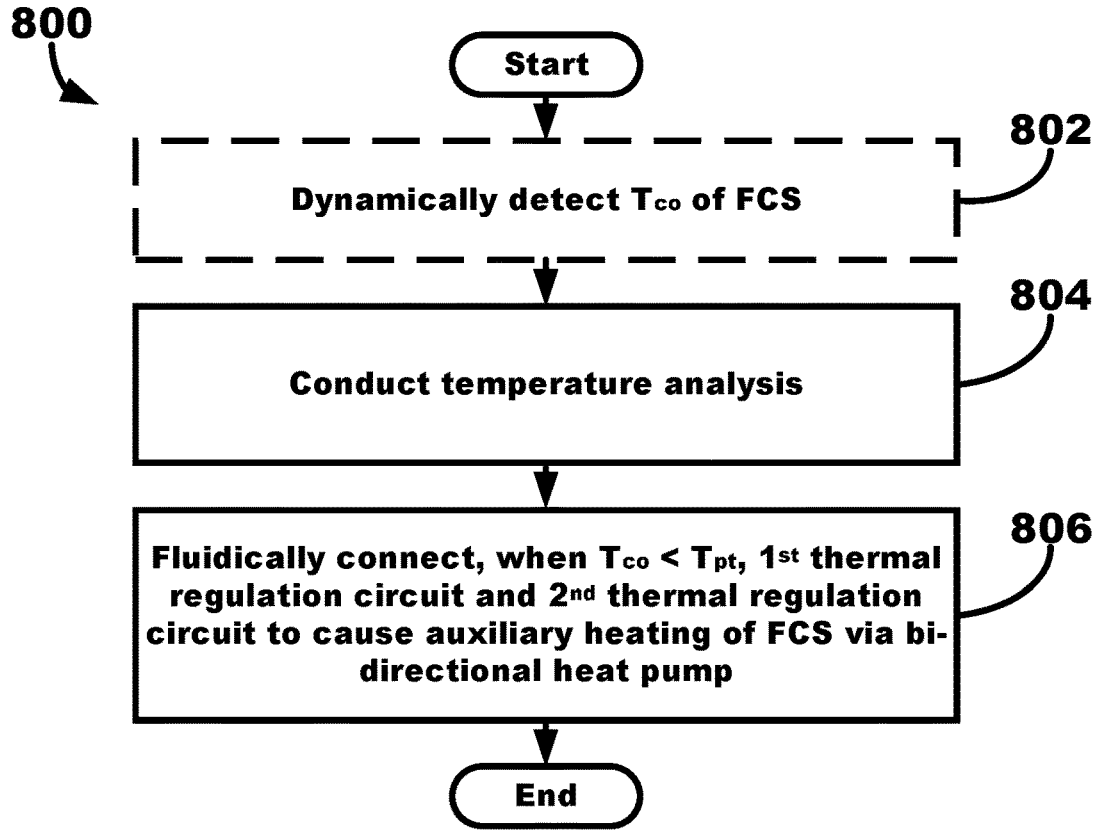

In the illustrated example embodiment of FIG. 8, illustrated process block 802 includes dynamically detecting $T_{co}$ of the FCS 152*b*.

The computer-implemented method 800 may then proceed to illustrated process block 804, which includes conducting, in response to the detection of the Too, a temperature analysis.

In accordance with the computer-implemented method 800, conducting the temperature analysis comprises executing a comparison of the detected $T_{co}$ to $T_{pt}$.

The computer-implemented method 800 may then proceed to illustrated process block 806, which includes fluidically connecting, when the detected $T_{co}$ is less than $T_{pt}$, a $1^{st}$ thermal regulation circuit for the FCS 152*b* and a $2^{nd}$ thermal regulation circuit for the vehicle HVAC system to cause thermal regulation that auxiliary heats the FCS 152*b* via a bi-directional heat pump of the vehicle HVAC system.

In accordance with the computer-implemented method 800, fluidically connecting the $1^{st}$ thermal regulation circuit and the $2^{nd}$ thermal regulation circuit comprises opening one or more control valves arranged in a bypass line to fluidically connect the $1^{st}$ thermal regulation circuit and the $2^{nd}$ thermal regulation circuit.

In accordance with the computer-implemented method 800, thermal regulation of the FCS 152*b* via a bi-directional heat pump comprises entering the FCS 152*b* into an auxiliary heating cycle by causing an auxiliary increase of the detected Too via the bi-directional heat pump to a value greater than the $T_{pt}$.

The computer-implemented method 800 can terminate or end after completion of illustrated process block 806.

Figure 9:
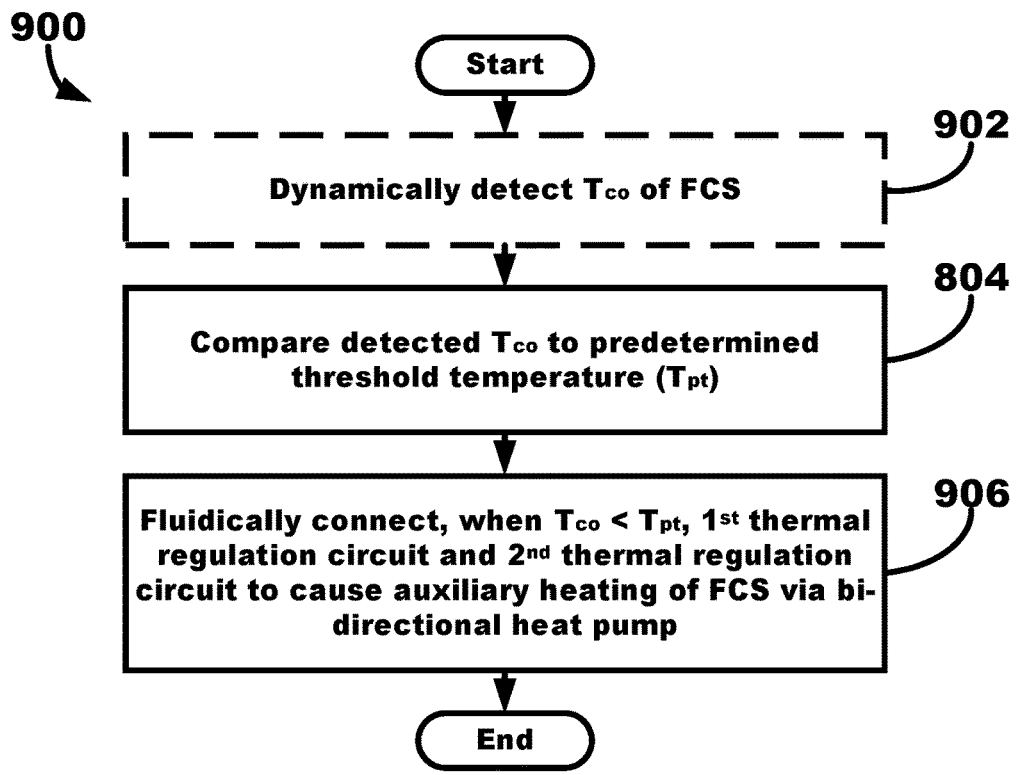

In the illustrated example embodiment of FIG. 9, illustrated process block 902 includes dynamically detecting $T_{co}$ of the FCS 152b.

The computer-implemented method 900 may then proceed to illustrated process block 904, which includes executing a comparison of the detected $T_{co}$ to $T_{pt}$.

The computer-implemented method 900 may then proceed to illustrated process block 906, which includes fluidically connecting, when the detected $T_{co}$ is less than $T_{pt}$, a 1$^{st}$ thermal regulation circuit for the FCS 152b and a 2$^{nd}$ thermal regulation circuit for the vehicle HVAC system to cause thermal regulation that auxiliary heats the FCS 152b via a bi-directional heat pump of the vehicle HVAC system.

In accordance with the computer-implemented method 900, fluidically connecting the 1$^{st}$ thermal regulation circuit and the 2$^{nd}$ thermal regulation circuit comprises opening one or more control valves arranged in a bypass line to fluidically connect the 1$^{st}$ thermal regulation circuit and the 2$^{nd}$ thermal regulation circuit.

In accordance with the computer-implemented method 900, thermal regulation of the FCS 152b via a bi-directional heat pump comprises entering the FCS 152b into an auxiliary heating cycle by causing an increase of the detected $T_{co}$ via the bi-directional heat pump to a value greater than the $T_{pt}$.

The computer-implemented method 900 can terminate or end after completion of illustrated process block 906.

Figure 10:
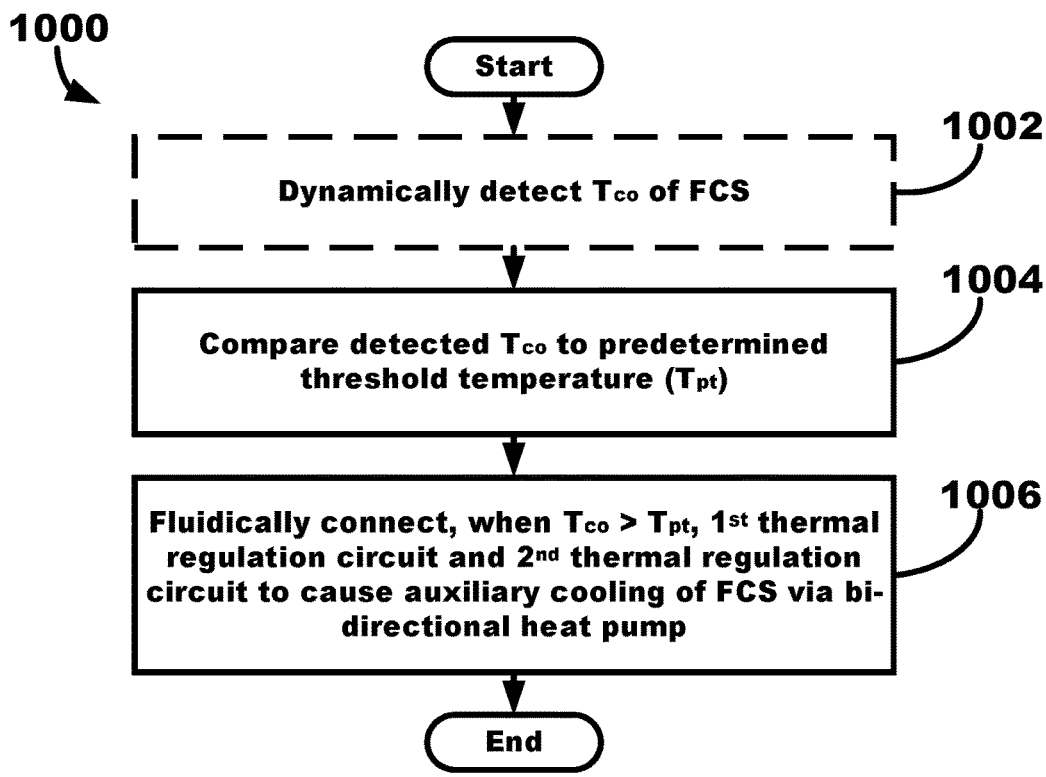

In the illustrated example embodiment of FIG. 10, illustrated process block 1002 includes dynamically detecting $T_{co}$ of the FCS 152b.

The computer-implemented method 1000 may then proceed to illustrated process block 1004, which includes executing a comparison of the detected $T_{co}$ to $T_{pt}$.

The computer-implemented method 900 may then proceed to illustrated process block 1006, which includes fluidically connecting, when the detected $T_{co}$ is greater than $T_{pt}$, a 1$^{st}$ thermal regulation circuit for the FCS 152b and a 2$^{nd}$ thermal regulation circuit for the vehicle HVAC system to cause thermal regulation that auxiliary cools the FCS 152b via a bi-directional heat pump of the vehicle HVAC system.

In accordance with the computer-implemented method 1000, fluidically connecting the 1$^{st}$ thermal regulation circuit and the 2$^{nd}$ thermal regulation circuit comprises opening one or more control valves arranged in a bypass line to fluidically connect the 1$^{st}$ thermal regulation circuit and the 2$^{nd}$ thermal regulation circuit.

In accordance with the computer-implemented method 1000, thermal regulation of the FCS 152b via a bi-directional heat pump comprises entering the FCS 152b into an auxiliary cooling cycle by causing an increase of the detected $T_{co}$ via the bi-directional heat pump to a value less than the $T_{pt}$.

The computer-implemented method 1000 can terminate or end after completion of illustrated process block 1006.

The terms "coupled," "attached," or "connected" may be used herein to refer to any type of relationship, direct or indirect, between the components in question, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle, comprising:
a fuel cell (FC) thermal regulation circuit for circulation of a radiant fluid, the FC thermal regulation circuit including a fuel cell stack (FCS) thermally regulated by the radiant fluid and operable to generate electric power, an AC evaporator/condenser, a heat exchange device operable to thermally regulate the radiant fluid, and an FC radiator operable to transmit heat absorbed from the radiant fluid that flows through the FC thermal regulation circuit to an area outside of the FCS; and
a heating, ventilation, and air-conditioning (HVAC) thermal regulation circuit for circulation of a refrigerant fluid to thermally regulate air in a vehicle passenger compartment, the HVAC thermal regulation circuit including the AC evaporator/condenser operable to supply air to an interior vehicle compartment, an HVAC radiator operable to transmit heat absorbed from the refrigerant fluid to an ambient environment outside of the vehicle, and a bi-directional heat pump operable to drive the refrigerant fluid and thereby facilitate selective auxiliary thermal regulation of the FCS.

2. The vehicle of claim 1, wherein the bi-directional heat pump facilitates thermal contact of the refrigerant fluid with the heat exchange device in a manner which facilitates selective auxiliary cooling and/or heating of the FCS.

3. The vehicle of claim 2, further comprising:
a first bypass fluid conduit operable to selectively fluidically connect the bi-directional heat pump and the heat exchange device during a clockwise flow of the refrigerant fluid by the bi-directional heat pump; and
a second bypass fluid conduit operable to selectively fluidically connect the bi-directional heat pump and the heat exchange device during an anti-clockwise flow of the refrigerant fluid by the bi-directional heat pump.

4. The vehicle of claim 3, further comprising:
one or more first control valves arranged in the first bypass fluid conduit; and
one or more second control valves arranged in the second bypass fluid conduit.

5. The vehicle of claim 4, further comprising a control device having one or more processors and a non-transitory memory operatively coupled to the one or more processors comprising a set of instructions executable by the one or more processors to cause the control device to:
control, in response to a detection as sensor data of an operating temperature of the fuel cell stack, the one or more first control valves and the one or more second control valves to fluidically connect the FC thermal regulation circuit and the HVAC thermal regulation circuit.

6. The vehicle of claim 5, wherein the set of instructions, when executed by the one or more processors, cause the control device to selectively open, in response to a detected operating temperature being greater than a predetermined threshold operating temperature, the one or more second control valves and thereby thermally regulate the FCS by causing an auxiliary reduction of an operating temperature of the FCS via the bi-directional heat pump to a value less than the predetermined threshold operating temperature.

7. The vehicle of claim 5, wherein the set of instructions, when executed by the one or more processors, cause the control device to selectively open, in response to a detected operating temperature being less than a predetermined threshold operating temperature, the one or more first control valves and thereby thermally regulate the FCS by causing an increase of the operating temperature of the FCS via the bi-directional heat pump to a value greater than the predetermined threshold operating temperature.

* * * * *